(12) United States Patent
Singhal et al.

(10) Patent No.: US 11,836,051 B2
(45) Date of Patent: Dec. 5, 2023

(54) METHOD AND SYSTEM FOR PROTECTING DATA DURING DATA MIGRATION

(71) Applicant: Dell Products L.P., Round Rock, TX (US)

(72) Inventors: Upanshu Singhal, Bangalore (IN); Shelesh Chopra, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 119 days.

(21) Appl. No.: 17/725,690

(22) Filed: Apr. 21, 2022

(65) Prior Publication Data

US 2023/0342261 A1    Oct. 26, 2023

(51) Int. Cl.
*G06F 11/00* (2006.01)
*G06F 11/14* (2006.01)
*G06F 21/62* (2013.01)

(52) U.S. Cl.
CPC ...... *G06F 11/1464* (2013.01); *G06F 11/1451* (2013.01); *G06F 11/1469* (2013.01); *G06F 21/6245* (2013.01); *G06F 2201/84* (2013.01)

(58) Field of Classification Search
None
See application file for complete search history.

(56) References Cited

U.S. PATENT DOCUMENTS

| | | | | |
|---|---|---|---|---|
| 9,201,736 | B1 * | 12/2015 | Moore | G06F 11/00 |
| 9,552,259 | B1 * | 1/2017 | Chopra | G06F 11/1461 |
| 9,892,123 | B2 * | 2/2018 | Kottomtharayil | G06F 11/1464 |
| 11,042,503 | B1 * | 6/2021 | Vig | G06F 11/1451 |
| 2012/0123999 | A1 * | 5/2012 | Ashutosh | G06F 16/128 |
| | | | | 707/618 |
| 2019/0227878 | A1 * | 7/2019 | Agarwal | G06F 8/658 |

OTHER PUBLICATIONS

Google Patents/Scholar search—text refined (Year: 2023).*

* cited by examiner

*Primary Examiner* — Christopher S McCarthy
(74) *Attorney, Agent, or Firm* — Chamberlain, Hrdlicka, White, Williams & Aughtry

(57) ABSTRACT

A method for managing data backup includes: making a determination that an asset source is a first type of asset source, in which a source client device comprises the asset source; generating, based on the determination, a data transfer path for a plurality of snapshots associated with the asset source between the source client device and a data protection system; initiating a backup for user data associated with the asset source to a target client device; obtaining the plurality of snapshots to the data protection system using the data transfer path, in which the user data is backed up in the target client device while at least a portion of the plurality of snapshots is obtained by the data protection system; and deleting the plurality of snapshots from the source client device, upon receipt of confirmation that the plurality of snapshots is successfully stored in the data protection system.

20 Claims, 6 Drawing Sheets

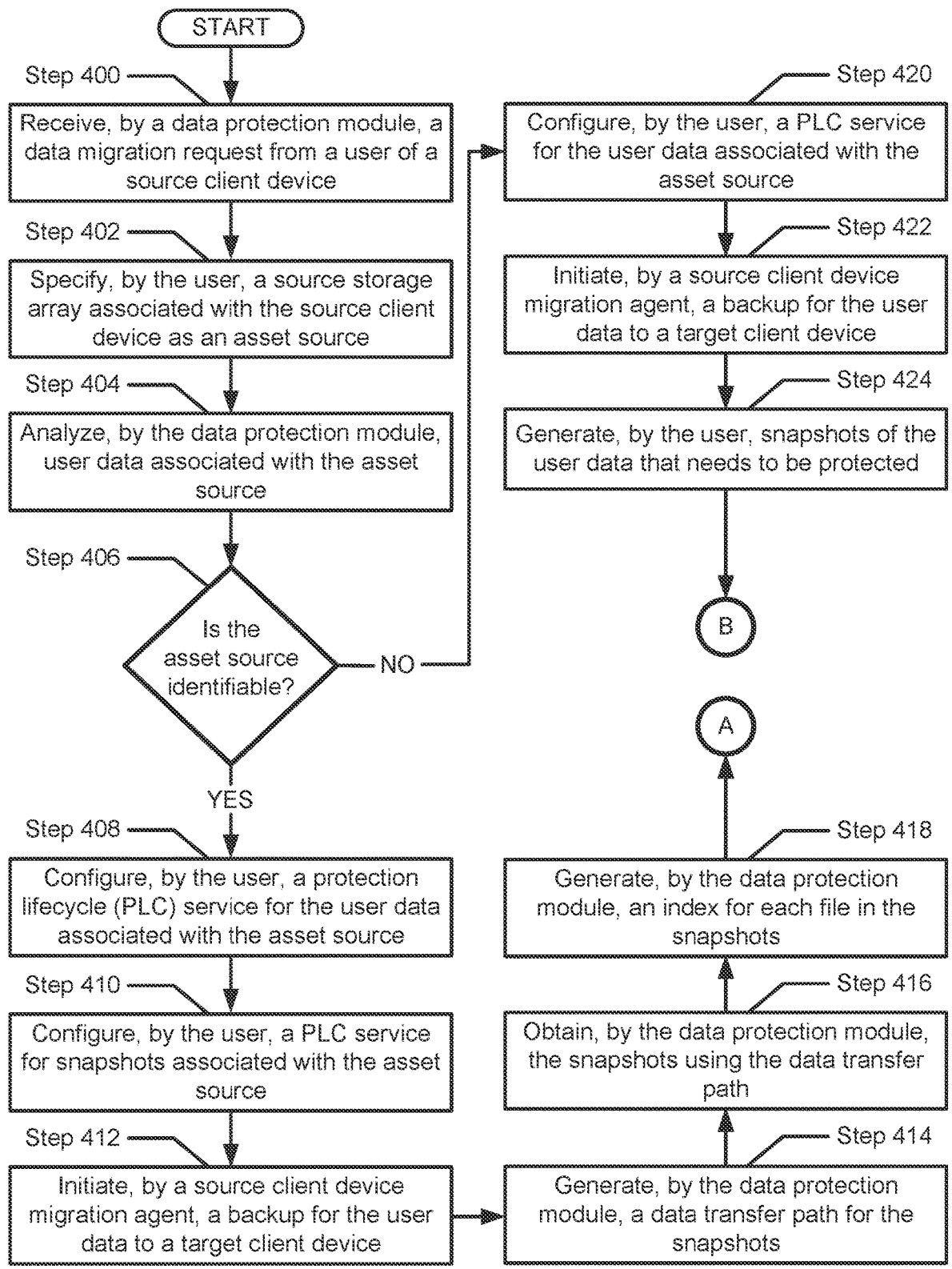
FIG. 4.1

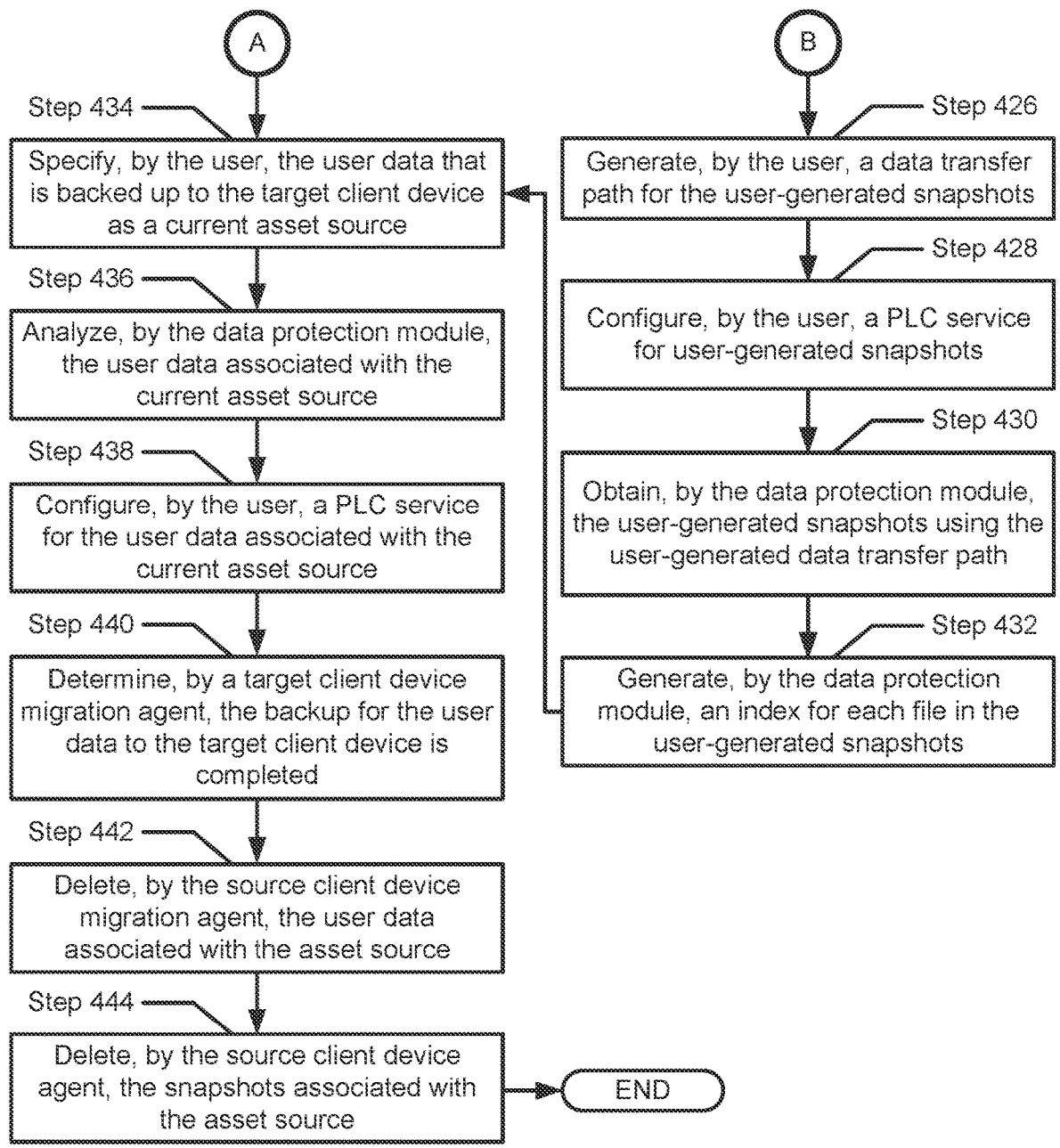
FIG. 4.2

METHOD AND SYSTEM FOR PROTECTING DATA DURING DATA MIGRATION

BACKGROUND

Computing devices may include any number of internal components such as processors, memory, and persistent storage. Computing resources associated with (e.g., used by) each of these internal components may be used to generate, store, and backup data. Such utilization of computing resources may affect the overall performance of the computing devices.

BRIEF DESCRIPTION OF DRAWINGS

Certain embodiments of the invention will be described with reference to the accompanying drawings. However, the accompanying drawings illustrate only certain aspects or implementations of the invention by way of example, and are not meant to limit the scope of the claims.

FIGS. 4.1 and 4.2 show a method for protecting data during data migration in accordance with one or more embodiments of the invention.

DETAILED DESCRIPTION

Figure 1:
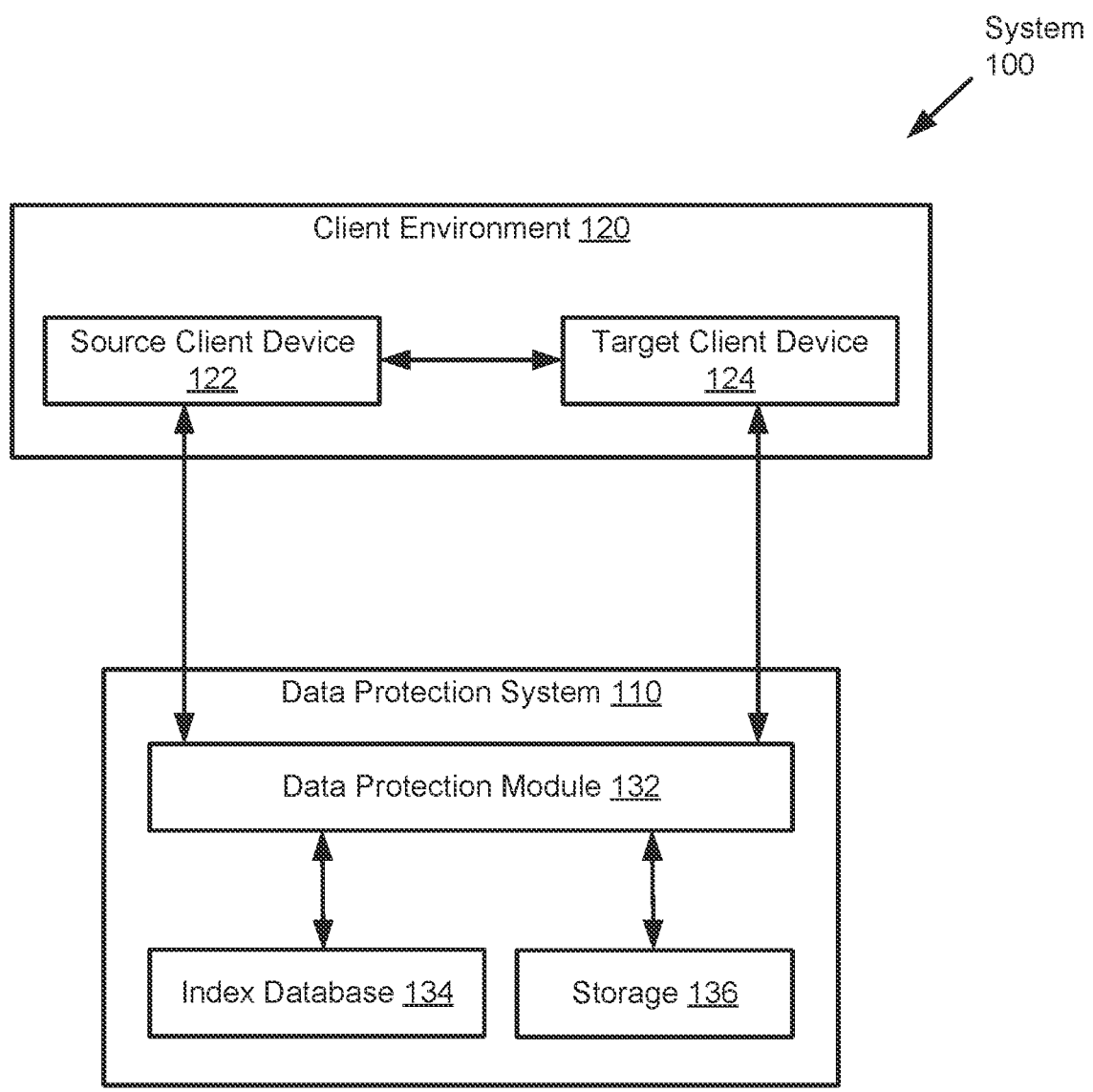
FIG. 1 shows a diagram of a system in accordance with one or more embodiments of the invention.

Specific embodiments of the invention will now be described in detail with reference to the accompanying figures. In the following detailed description of the embodiments of the invention, numerous specific details are set forth in order to provide a more thorough understanding of one or more embodiments of the invention. However, it will be apparent to one of ordinary skill in the art that the one or more embodiments of the invention may be practiced without these specific details. In other instances, well-known features have not been described in detail to avoid unnecessarily complicating the description.

In the following description of the figures, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment, which may be implemented in addition to, in conjunction with, or in place of the embodiments described with regard to a corresponding like-named component in any other figure.

Throughout this application, elements of figures may be labeled as A to N. As used herein, the aforementioned labeling means that the element may include any number of items, and does not require that the element include the same number of elements as any other item labeled as A to N. For example, a data structure may include a first element labeled as A and a second element labeled as N. This labeling convention means that the data structure may include any number of the elements. A second data structure, also labeled as A to N, may also include any number of elements. The number of elements of the first data structure, and the number of elements of the second data structure, may be the same or different.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

As used herein, the phrase operatively connected, or operative connection, means that there exists between elements/components/devices a direct or indirect connection that allows the elements to interact with one another in some way. For example, the phrase 'operatively connected' may refer to any direct connection (e.g., wired directly between two devices or components) or indirect connection (e.g., wired and/or wireless connections between any number of devices or components connecting the operatively connected devices). Thus, any path through which information may travel may be considered an operative connection.

In general, a user of a computing device (e.g., a source client device) may need to migrate data (e.g., user data, a plurality of snapshots, etc.) stored in an asset source (e.g., a storage array) of the source client device to an asset source of another computing device (e.g., a target client device). Typically, while migrating data from the source client device to the target client device, data protection related issues (e.g., data identification issues, data privacy issues, etc.) may occur because the asset source of the source client device may be a different type of asset source (e.g., a first type of asset source) than the asset source (e.g., a second type of asset source) of the target client device. Embodiments of the invention relate to methods and systems for protecting data during such data migrations. More specifically, various embodiments of the invention may first determine an asset source type of the source client device's asset source. After the determination, a data transfer path for a plurality of snapshots of the source client device's asset source may be generated between the source client device and a data protection system. A backup may then be initiated for user data of the source client device's asset source (based on the determined asset source type of the source client device's asset source) to a target client device. The plurality of snapshots of the source client device's asset source may be transmitted to the data protection system using the data transfer path. Finally, the plurality of snapshots of the source client device's asset source may be deleted from the source client device upon receipt of confirmation that the plurality of snapshots is successfully stored in the data protection system. Such data migration using the data protection system advantageously prevents data protection related issues when the two asset sources are of different types.

The following describes various embodiments of the invention.

FIG. 1 shows a diagram of a system (100) in accordance with one or more embodiments of the invention. The system (100) includes a client environment (120) and a data protection system (110). The system (100) may include additional, fewer, and/or different components without departing from the scope of the invention. Each component may be operably connected to any of the other component via any combination of wired and/or wireless connections. Each component illustrated in FIG. 1 is discussed below.

In one or more embodiments of the invention, the client environment (120) may include a source client device (122) and a target client device (124). The source client device (122) and the target client device (124) may be physical or logical devices, as discussed below.

Figure 2:
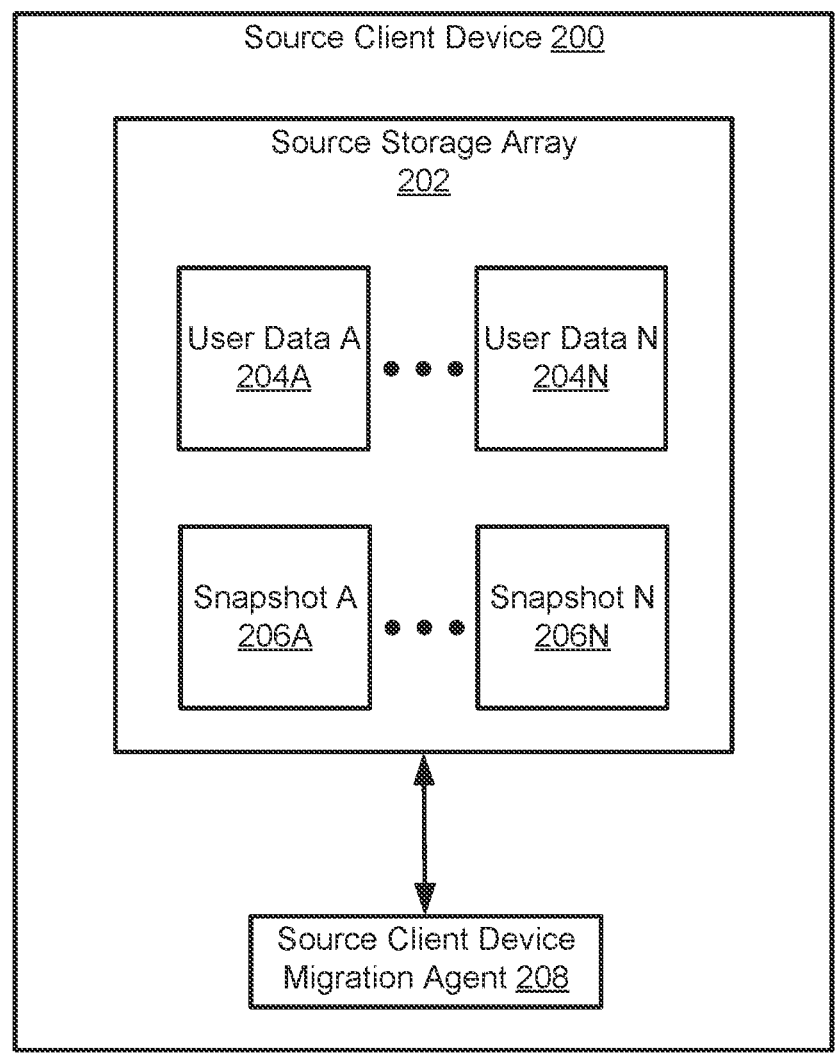
FIG. 2 shows a diagram of a source client device in accordance with one or more embodiments of the invention.

In one or more embodiments of the invention, the source client device (122) may include a source storage array (e.g., 202, FIG. 2) and a source client device migration agent (e.g., 208, FIG. 2). Additional details regarding these components of the source client device are described below in reference to FIG. 2.

Figure 5:
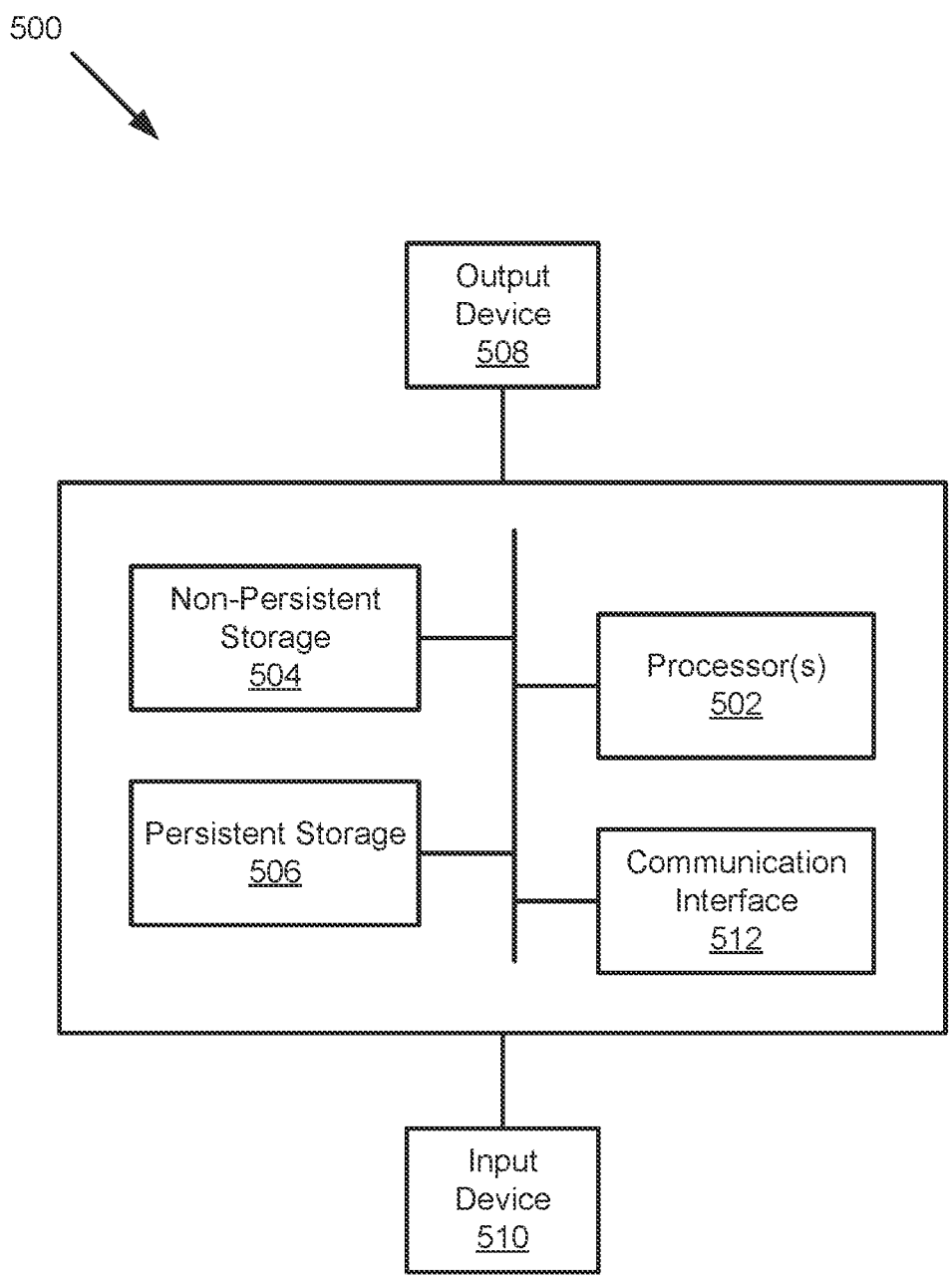
FIG. 5 shows a diagram of a computing device in accordance with one or more embodiments of the invention.

In one or more embodiments of the invention, the source client device (122) may be implemented as a computing device (e.g., 500, FIG. 5). The computing device may be, for example, a mobile phone, a tablet computer, a laptop computer, a desktop computer, a server, a distributed computing system, or a cloud resource. The computing device may include one or more processors, memory (e.g., random access memory (RAM)), and persistent storage (e.g., disk drives, solid-state drives (SSDs), etc.). The computing device may include instructions, stored on the persistent storage, that when executed by the processor(s) of the computing device, cause the computing device to perform the functionality of the source client device (122) described throughout this application.

Alternatively, in one or more embodiments of the invention, the source client device (122) may be implemented as a logical device. The logical device may utilize the computing resources of any number of computing devices to provide the functionality of the source client device (122) described throughout this application.

Figure 3:
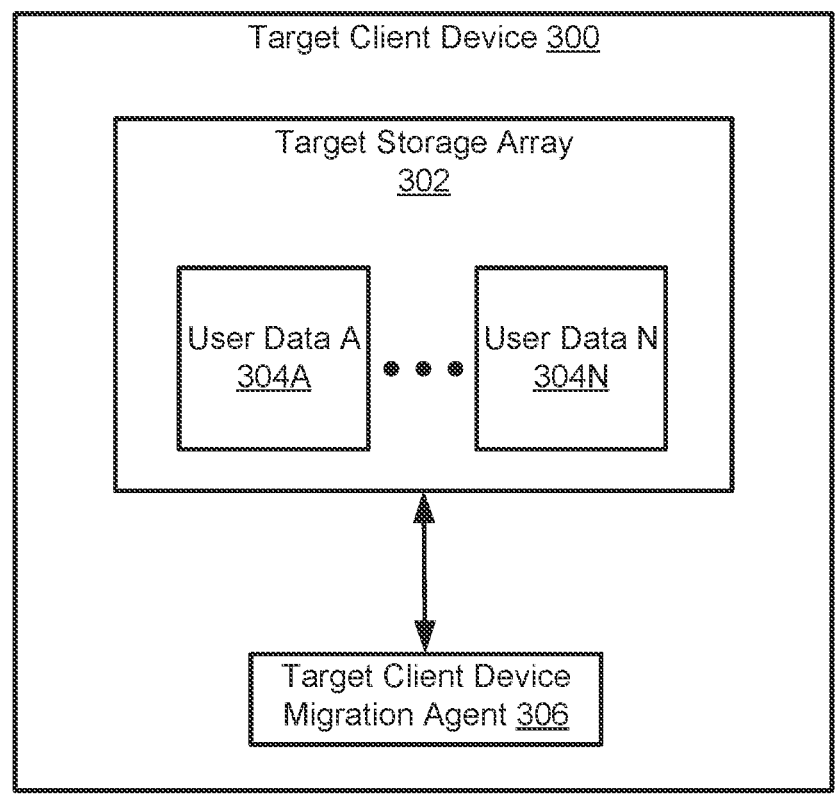
FIG. 3 shows a diagram of a target client device in accordance with one or more embodiments of the invention.

In one or more embodiments of the invention, the target client device (124) may include a target storage array (e.g., 302, FIG. 3) and a target client device migration agent (e.g., 306, FIG. 3). Additional details regarding these components of the target client device are described below in reference to FIG. 3.

In one or more embodiments of the invention, the target client device (124) may be implemented as a computing device (e.g., 500, FIG. 5). The computing device may be, for example, a mobile phone, a tablet computer, a laptop computer, a desktop computer, a server, a distributed computing system, or a cloud resource. The computing device may include one or more processors, memory (e.g., RAM), and persistent storage (e.g., disk drives, SSDs, etc.). The computing device may include instructions, stored on the persistent storage, that when executed by the processor(s) of the computing device, cause the computing device to perform the functionality of the target client device (124) described throughout this application.

Alternatively, in one or more embodiments of the invention, similar to the source client device (122), the target client device (124) may also be implemented as a logical device, as discussed above.

In one or more embodiments of the invention, the data protection system (110) may include a data protection module (132), an index database (134), and a storage (136). The data protection module (132), the index database (134), and the storage (136) may be physical or logical devices, as discussed below.

In one or more embodiments of the invention, the data protection module (132) may provide backup (e.g., migration) services to the source client device (122) and the target client device (124). The backup services may include generation and storage of backups in the storage (136). The backup services may also include restoration (e.g., recovery) of the source client device (122) and the target client device (124) using the backups stored in the storage (136).

More specifically, the data protection module (132) may provide backup services to the source client device (122) and the target client device (124) by orchestrating: (i) generation of backups of the source storage array (e.g., 202, FIG. 2) and the target storage array (e.g., 302, FIG. 3); (ii) storage of the generated backups of the source storage array (e.g., 202, FIG. 2) and the target storage array (e.g., 302, FIG. 3) in the storage (136) of the data protection system (110); (iii) consolidation of backup requests to reduce or prevent generation of backups that are not useful for restoration purposes; and (iv) restoration of the source client device (122) and the target client device (124) to previous states using backups stored in the storage (136) of the data protection system (110).

Additionally, to provide the aforementioned backup services, the data protection module (132) may include functionality to generate and issue instructions to any component of the system (100) of FIG. 1. In one or more embodiments, the data protection module (132) may also generate instructions in response to backup requests from any component of the client environment (120).

In one or more embodiments of the invention, the data protection module (132) may generate such instructions in accordance with backup schedules that specify when backups are to be generated. In one or more embodiments, a backup schedule may lay out specific points in time for a backup process to be performed. Additionally, these backup schedules may be configured based on a user's recovery point objective (RPO).

More specifically, in one or more embodiments of the invention, the time between a data loss event and a most recent backup may be referred to herein as the "user's RPO." For example, if a user has a 4-hour RPO for an application (e.g., software), then the maximum gap between the data loss event and the most recent backup will be 4-hours. In some scenarios, having a 4-hour RPO may not necessarily mean the user will lose 4 hours' worth of data. For example, a word processing application may go down at 12:35 am and may be restored by 1:10 am. In this case, the user may not have much data to lose.

In another example, a security application may go down at 10:05 am and may not be restored until 1:25 pm. In this case, the user may lose data that is highly valuable to the user. For this reason, the user may set an RPO based on the application priority and may configure the backup schedules accordingly.

In one or more embodiments of the invention, the data protection module (132) may be implemented as a computing device (e.g., 500, FIG. 5). The computing device may be, for example, a mobile phone, a tablet computer, a laptop computer, a desktop computer, a server, a distributed computing system, or a cloud resource. The computing device may include one or more processors, memory (e.g., RAM), and persistent storage (e.g., disk drives, SSDs, etc.). The computing device may include instructions, stored on the persistent storage, that when executed by the processor(s) of the computing device, cause the computing device to perform the functionality of the data protection module (132) described throughout this application.

Alternatively, in one or more embodiments of the invention, similar to the source client device (122), the data protection module (132) may also be implemented as a logical device, as discussed above.

In one or more embodiments of the invention, the index database (134) may refer to a database (or any logical container) to and from which a plurality of snapshots (e.g., 206A, 206N) (also referred to herein as "snapshots" or "user-generated snapshots") may be stored and/or retrieved, respectively. The index database (134) may occupy a portion of a physical storage device (discussed below) or, alternatively, may span across multiple physical storage devices. Additional details regarding the plurality of snapshots are described below in reference to FIG. 2.

In one or more embodiments of the invention, the index database (134) may provide indexing services. In one or more embodiments, the indexing services may optimize the performance of a database by reducing a required amount of database access(es) when implementing a request (e.g., a data retrieval request). In this manner, requested data may be quickly located and accessed from the database using an index of the requested data. In one or more embodiments, an index may refer to a database structure that is defined by one or more field expressions. A field expression may be a single field name such as user_number. For example, an index (e.g., E41295) may refer to user name (e.g., Adam Smith) and user_number (e.g., 012345), in which the requested data is Adam Smith 012345.

In one or more embodiments of the invention, the index database (134) may be implemented as a computing device (e.g., 500, FIG. 5). The computing device may be, for example, a mobile phone, a tablet computer, a laptop computer, a desktop computer, a server, a distributed computing system, or a cloud resource. The computing device may include one or more processors, memory (e.g., RAM), and persistent storage (e.g., disk drives, SSDs, etc.). The computing device may include instructions, stored on the persistent storage, that when executed by the processor(s) of the computing device, cause the computing device to perform the functionality of the index database (134) described throughout this application.

Alternatively, in one or more embodiments of the invention, similar to the source client device (122), the index database (134) may also be implemented as a logical device, as discussed above.

In one or more embodiments of the invention, the storage (136) of the data protection system (110) may provide data storage services. For example, the storage (136) may store backups of the source storage array (e.g., 202, FIG. 2) and the target storage array (e.g., 302, FIG. 3). The storage (136) may also provide copies of previously stored backups of the source storage array (e.g., 202, FIG. 2) and the target storage array (e.g., 302, FIG. 3).

In one or more embodiments of the invention, the storage (136) may be implemented as a computing device (e.g., 500, FIG. 5). The computing device may be, for example, a mobile phone, a tablet computer, a laptop computer, a desktop computer, a server, a distributed computing system, or a cloud resource. The computing device may include one or more processors, memory (e.g., RAM), and persistent storage (e.g., disk drives, SSDs, etc.). The computing device may include instructions, stored on the persistent storage, that when executed by the processor(s) of the computing device, cause the computing device to perform the functionality of the storage (136) described throughout this application.

Alternatively, in one or more embodiments of the invention, similar to the source client device (122), the storage (136) may also be implemented as a logical device, as discussed above.

Turning now to FIG. 2, FIG. 2 shows a diagram of a source client device in accordance with one or more embodiments of the invention. The source client device (200) may be the same as the source client device (122) as discussed above in reference to FIG. 1. The source client device (200) may include a source storage array (202) and a source client device migration agent (208). The source client device (200) may include additional, fewer, and/or different components without departing from scope of the invention. Each component may be operably connected to any of the other component via any combination of wired and/or wireless connections. Each component illustrated in FIG. 2 is discussed below.

In one or more embodiments of the invention, the source storage array (202) may be a network-attached storage (NAS) array. In one or more embodiments, the NAS array may be a collection of one or more physical storage devices, in which various forms of digital data may be consolidated. The various forms of digital data may include, but are not limited to: user data (user data A (204A), user data N (204N)), snapshots (snapshot A (206A), snapshot N (206N)), etc. Each physical storage device may include non-transitory computer readable storage media, in which all or some of the user data (204A, 204N) and/or the snapshots (206A, 206N) may be temporarily or permanently stored.

In one or more embodiments of the invention, each physical storage device may be designed and configured based on a common or different storage technology—examples of which may include, but are not limited to: flash based storage devices, fibre-channel (FC) based storage devices, serial advanced technology attachment (SATA) storage devices, etc.

In one or more embodiments of the invention, any subset of (or all of) the storage array may be implemented using persistent (i.e., non-volatile) storage. Examples of persistent storage may include, but are not limited to: optical storage, magnetic random access memory (M-RAM), spin torque magnetic RAM (ST-MRAM), phase-change memory (PCM), etc.

In one or more embodiments of the invention, the source storage array (202) may host a database (or any logical container) to and from which the user data (204A, 204N) and the snapshots (206A, 206N) may be stored and retrieved, respectively. The database may occupy a portion of a physical storage device or, alternatively, may span across multiple physical storage devices. In one or more embodiments, the user data (204A, 204N) may refer to a composite of various database objects including, but not limited to: one or more recovery catalogs, one or more data files, one or more control files, one or more archive log files, etc. Each of these database objects is described below.

In one or more embodiments of the invention, a recovery catalog may be a database object that stores metadata of a backup process (also referred to herein as "backup metadata"). The recovery catalog may include entries for one or more backup processes. The entries may include backup metadata that specify information regarding successfully backed up data files from one or more previously executed backup processes. For example, the backup metadata may include, but is not limited to: data file identifiers, data file storage locations, etc.

In one or more embodiments of the invention, a data file may be a database object that stores database data. The database data may include computer readable content (e.g., text, image, video, audio, machine code, any other form of computer readable content, or a combination thereof) that may be generated, interpreted, and/or processed by an application.

In one or more embodiments of the invention, the application may be a computer program that is executed on the source client device (200). More specifically, the application may be designed and configured to perform one or more operations (e.g., functions, tasks, activities) instantiated by the user of the source client device (200). Examples of the application may include, but are not limited to: a word processor, a media player, a web browser, a file viewer, an image editor, etc.

In one or more embodiments of the invention, while performing these operations, the application may include functionality to request and use resources (e.g., processors, memory, network bandwidth, etc.) of the source client device (200). The application may perform other types of functionalities not listed above without departing from the scope of the invention.

In one or more embodiments of the invention, the data file may store database data in: (i) an undeduplicated form; or (ii) a deduplicated form. Briefly, the deduplicated form of the database data may be generated through the application of data deduplication on the undeduplicated form of the database data. That is, undeduplicated database data may include computer readable content that may or may not entail redundant information. In contrast, deduplicated database data may result from the elimination of any redundant information analyzed throughout an undeduplicated computer readable content.

In one or more embodiments of the invention, the deduplication database may reflect a content recipe of the undeduplicated computer readable content. A content recipe may be a sequence of chunk identifiers (or pointers) of (or directed to) unique database data chunks consolidated in the physical storage. The sequence of chunk identifiers (as a representative of the deduplicated database data) may be used to reconstruct the corresponding undeduplicated database data. Additionally, a given chunk identifier for a given database data chunk may include a cryptographic fingerprint or hash of the given database data chunk.

In one or more embodiments of the invention, a control file may be a database object that stores database metadata. The database metadata may include information descriptive of the database's status and structure. For example, the database metadata may include, but is not limited to: a database name assigned to the source client device (200); the name(s) and storage location(s) of one or more data files; a creation timestamp encoding the data; a log sequence number of a current archive log file; etc.

In one or more embodiments of the invention, an archive log file may be a database object that stores the history of changes made to the database data. The archive log file may include one or more redo entries (or redo records), which may include a set of change vectors. Each change vector may describe (or represent) a modification made to a subset of the user data (204A, 204N) (e.g., a single data block of the archive log file). In one or more embodiments, the archive log file may serve to recover the user data (204A, 204N) should a failover occur, or to apply recent changes to a recovered user data (204A, 204N) that was recovered during a backup.

In one or more embodiments of the invention, the snapshots (206A, 206N) may refer to point-in-time copies of the user data (204A, 204N). For example, snapshot A (206A) of the snapshots (206A, 206N) may include the database objects (discussed above) of the user data (204A, 204N) at a specific point in time. As another example, snapshot N (206N) of the snapshots (206A, 206N) may include the database objects of the user data (204A, 204N) at a later point in time than the specific point in time captured by snapshot A (206A).

In one or more embodiments of the invention, the source client device migration agent (208) may initiate (e.g., instantiate, execute, etc.) a backup for the user data (204A, 204N) to back up one or more of the user data (204A, 204N) to the target client device (e.g., 300, FIG. 3). In one or more embodiments, the source client device migration agent (208) may monitor the status (e.g., a currently active or completed status) of a backup that is being executed. The status of the backup may specify information such as: (i) whether the backup was successful and whether the backup was completed within a backup window (e.g., 100% of the backup was completed); or (ii) whether the backup was unsuccessful and how much of the backup was not completed within the backup window (e.g., 80% of the backup was completed and 20% of the backup was not completed). In one or more embodiments, the backup window may be a period of time, with a definite start and end, within which a backup is set to be completed.

In one or more embodiments of the invention, the source client device migration agent (208) may include a backup monitoring service for monitoring the status of the backup. The backup monitoring service may represent a computer program that may execute on the underlying hardware of the source client device migration agent (208). Specifically, the backup monitoring service may be designed and configured to facilitate remote access to check the status of and/or to manipulate remotely stored user data (204A, 204N) in the target storage array (e.g., 302, FIG. 3) during the backup. Further, the backup monitoring service may include functionality to control remote procedure calls (e.g., application programming interface (API) calls) directed to accessing and manipulating any granularity of the remotely stored user data (204A, 204N) during the backup.

In one or more embodiments of the invention, an API call may refer to a process of an application submitting a request to an API to retrieve the requested data from an external application. An API may represent a collection of methods and procedures (e.g., retrieving information about an API source, updating the API source, etc.) that may be executed by one or more applications in a computing system (e.g., 500, FIG. 5). The collection of methods and procedures may be designed and configured to facilitate the source client device migration agent's (208) access to check the status of and/or manipulate remotely stored user data (204A, 204N).

In one or more embodiments of the invention, when backing up of the user data (204A, 204N) is completed, the target client device migration agent (e.g., 306, FIG. 3) may send a notification (e.g., a confirmation notification) to the source client device migration agent (208) regarding the completed backup. In one or more embodiments, the notification may indicate whether the backup was completed within a backup window or whether the backup was completed after exceeding the backup window.

In one or more embodiments of the invention, the notification generated by the target client device migration agent (e.g., 306, FIG. 3) may be displayed on a graphical user interface (GUI). In one or more embodiments of the invention, the GUI may be displayed on a display of the computing device (e.g., 500, FIG. 5) using functionalities of a display engine (not shown), in which the display engine is operatively connected to the computing device. The display engine may be implemented using hardware, software, or any combination thereof. The notification generated by the target client device migration agent (e.g., 306, FIG. 3) may be displayed in any visual format that would allow the user to easily comprehend (e.g., read and parse) the listed information.

In one or more embodiments of the invention, while the user data (204A, 204N) is being backed up from the source client device (200) to the target client device (300), the data protection module (e.g., 132, FIG. 1) may concurrently obtain at least a portion of the snapshots (206A, 206N) from the source client device (200). The data protection module (e.g., 132, FIG. 1) may then store the obtained snapshots (206A, 206N) in storage (e.g., 136, FIG. 1). Additional details about how the snapshot(s) (206A, 206N) are obtained and stored are described below in reference to FIGS. 4.1 and 4.2.

In one or more embodiments of the invention, after the snapshots (206A, 206N) are stored in the storage (e.g., 136, FIG. 1), the data protection module (e.g., 132, FIG. 1) may notify the source client device migration agent (208) that the snapshots (206A, 206N) have been stored. The source client device (200) may then display on the GUI that the snapshots (206A, 206N) have been stored.

In one or more embodiments of the invention, based on receiving notifications received from both the target client device migration agent (e.g., 306, FIG. 3) and the data protection module (e.g., 132, FIG. 1), the source client device migration agent (208) may delete the user data (204A, 204N) from the source storage array (202) based on one or more schedule(s). For example, in one or more embodiments, a schedule to delete the user data (204A, 204N) may be based on a protection lifecycle (PLC) service for the user data (204A, 204N) provided by the data protection module (e.g., 132, FIG. 1) to the source client device (200). The PLC service may allow configuration of one or more service level agreements (SLAs) related to, for example: user data (204A, 204N) retention, user data (204A, 204N) migration to an archive location (e.g., a cloud resource), etc.

In one or more embodiments of the invention, data retention (also referred to herein as a "data retention policy") may be a period of time, with a definite start and end, within which the data should be retained in storage. For example, a set of user requirements (e.g., storage user's need of storage space) and/or technical considerations (e.g., security, performance, and storage policies considerations) of a data center, may be used to generate a data retention policy specifying that the user data (204A, 204N) should be retained in the storage for seven years.

In one or more embodiments of the invention, based on receiving one or more notifications from only the data protection module, the source client device migration agent (208) may delete the snapshots (206A, 206N) from the source storage array (202) based on one or more of schedules based on one or more protection lifecycle (PLC) service(s).

In one or more embodiments of the invention, the source client device migration agent (208) may be implemented in hardware (i.e., circuitry), software, or any combination thereof to perform the functionality of the source client device migration agent (208) described throughout this application.

Turning now to FIG. 3, FIG. 3 shows a diagram of a target client device in accordance with one or more embodiments of the invention. The target client device (300) may be the same as the target client device (124) as discussed above in reference to FIG. 1. The target client device (300) may include a target storage array (302) and a target client device migration agent (306). The target client device (300) may include additional, fewer, and/or different components without departing from scope of the invention. Each component may be operably connected to any of the other component via any combination of wired and/or wireless connections. Each component illustrated in FIG. 3 is discussed below.

In one or more embodiments of the invention, similar to the source storage array (e.g., 202, FIG. 2), the target storage array (302) may be a NAS array. The target storage array (302) may include the user data (304A, 304N) that is backed up from the source storage array (e.g., 202, FIG. 2). The target storage array (302) may also include other types of data without departing from the scope of the invention.

In one or more embodiments of the invention, the target client device migration agent (306) may provide backup services to the source client device migration agent (e.g., 208, FIG. 2). The backup services may include, but are not limited to: monitoring a status of a backup; sending a notification when a backup is completed; etc. Certain details regarding the backup services provided by the target client device migration agent have been described above in reference to FIG. 2.

In one or more embodiments of the invention, the target client device migration agent (306) may be implemented in hardware (i.e., circuitry), software, or any combination thereof to perform the functionality of the target client device migration agent (306) described throughout this application.

In one or more embodiments of the invention, to continue protecting the user data (304A, 304N) backed up from the source storage array (e.g., 202, FIG. 2), one or more PLC services (as discussed above in FIG. 2) provided by the data protection module (e.g., 132, FIG. 1) may be used.

FIGS. 4.1 and 4.2 show a method for protecting data during data migration in accordance with one or more embodiments of the invention. While various steps in the method are presented and described sequentially, those skilled in the art will appreciate that some or all of the steps may be executed in different orders, may be combined or omitted, and some or all steps may be executed in parallel without departing from the scope of the invention.

Turning now to FIG. 4.1, the method shown in FIG. 4.1 may be performed by, for example, the above-discussed data protection module (e.g., 132, FIG. 1) in combination with the source client device migration agent (e.g., 208, FIG. 2). Other components of the system (100) illustrated in FIG. 1 may also execute all or part of the method shown in FIG. 4.1 without departing from the scope of the invention.

In Step 400, a data migration request (e.g., a data backup request) is received from (e.g., a user of) the source client device (e.g., 200, FIG. 2) by the data protection module.

In Step 402, a source storage array (e.g., 202, FIG. 2) of the source client device is specified in the data migration request as an asset source.

In Step 404, user data (e.g., 204A, 204N, FIG. 2) stored in (i.e., of) the asset source is analyzed. In one or more embodiments, the user data may be analyzed by the data protection module to generate a PLC service for the user data.

In Step 406, a determination is executed to determine whether the asset source is identifiable. If the result of the determination is YES, the method proceeds to Step 408.

If the result of the determination is NO, the method proceeds to Step 420. More specifically, if the data protection module, the source client device, and a target client device (e.g., 300, FIG. 3) are provided by the same vendor (e.g., a first vendor), the data protection module may identify the asset source as a first type of asset source specific to the first vendor. As another example, if the data protection module and the target client device are provided by the first vendor but the source client device is provided by a different vendor (e.g., a second vendor different from the first vendor), the data protection module may not be able to identify the asset source because the asset source may be a second type of asset source specific to the second vendor.

In Step 408, in response to the asset source being identifiable in Step 406, a PLC service may be configured for the user data of the asset source. In one or more embodiments, the PLC service may be configured by the user.

In Step 410, a PLC service is configured for snapshots (e.g., 206A, 206N, FIG. 2) stored in (i.e., of) the asset source. Similar to in Step 408, the PLC service may be configured by the user. Additionally, the snapshots may be automatically generated by the source client device migration agent as a result of the asset source being identifiable in Step 406 (e.g., as a result of the data protection module and the source client device being provided by the same first vendor).

In Step 412, a backup is initiated to back up the user data from the asset source to the target client device. In one or more embodiments, as discussed above in reference to FIG. 2, the backup for the user data may be initiated by the source client device migration agent.

In Step 414, a data transfer path is generated for the snapshots of the asset source by the data protection module. In one or more embodiments, the data transfer path may be a data transfer connection established between the data protection module and the source client device via a network (e.g., a local area network (LAN), a wireless LAN (WLAN), etc.). The network may include various interconnected subcomponents (not shown) (e.g., switches, routers, gateways, etc.) that may facilitate data transfer between the data protection module and the source client device.

In Step 416, the snapshots of the asset source are obtained (e.g., by the data protection module) using the data transfer path generated in Step 414.

In one or more embodiments of the invention, the data protection module may then store the snapshots in the storage (e.g., 136, FIG. 1). In one or more embodiments, the data protection module may store the snapshots using an auto slicing method or an auto scale method. For example, a backup for data with a size of 800 GB may take ten hours. Implementing the auto slicing method may result in the obtaining of one or more directories (e.g., a collection of files in a computing device) of the 800 GB data to create one or more data slices (e.g., a 150 GB data slice, a 50 GB data slice, etc.) corresponding to each directory. By doing so, the 800 GB data may be backed up in less time (e.g., in seven hours rather than the original ten) because the data slices can be backed up together (i.e., concurrently) in parallel.

In one or more embodiments of the invention, after creating the data slice(s) using the auto slicing method, the auto scale method may be implanted. Continuing with the auto slicing method example discussed above, if a backup is executed for each of the data slices in the same production host (discussed below), performance degradation in production workloads (e.g., reading data from a table, writing data to the table, etc.) may be experienced because the backup of each of the data slices may use all of the available computing resources in the production host. By implementing the auto scale method, each data slice may be distributed to a different production host such that the data slices of the 800 GB data may be backed up without using all of the available computing resources of a single production host. By distributing the data slices to different production hosts, the 800 GB data may be backed up in yet a shorter amount of time (e.g., in four hours rather than the already shortened seven hours).

In one or more embodiments of the invention, a production host (not shown) may be a computing device (physical or virtual) that provides services to the source client device. For example, the production host may host any number of applications that provide application services to the source client device. Application services may include, but are not limited to: database services, electronic communication services, instant messaging services, file storage services, etc.

In Step 418, an index is generated for each file in the snapshots by, for example, the data protection module.

In Step 420, as a result of the determination in Step 406 being NO (e.g., the asset source was not identifiable) and similar to Step 408, a PLC service is configured for the user data of the asset source. However, different from when then results of the determination in Step 406 being YES (e.g., the asset source was identifiable), after Step 420, certain components (e.g., the snapshots and the data transfer path) used for the backup being executed may have to be manually generated by the user instead of being automatically generated by the data protection module and/or the source client device migration agent, as discussed above in Steps 410 to 414.

In Step 422, similar to Step 412, a backup is initiated for the user data of the asset source to the target client device.

In Step 424, snapshots are generated for the user data that needs to be protected (e.g., backed up) by, for example, the user. This is different from when the asset source was identifiable in Step 406 where the snapshots are automatically generated by the source client device migration agent (in Step 410 following Step 406) because the source client device knows the specifications and format of the asset sources in both the source client device and the target client device. Said in another way, when the two asset sources are provided by different vendors, the source client device migration agent is unable to automatically generate the snapshots because the source client device cannot guarantee that the generated snapshots fit (i.e., conform with) the specifications and format required by both asset sources.

Turning now to FIG. 4.2, the method shown in FIG. 4.2 may be performed by, for example, the above-discussed data protection module in combination with the source client device migration agent and the target client device migration agent. Other components of the system (100) illustrated in FIG. 1 may also execute all or part of the method shown in FIG. 4.2 without departing from the scope of the invention.

In Step 426, a data transfer path is generated for the user-generated snapshots from Step 424. In one or more embodiments, similar to the snapshot in Step 422, the data transfer path for the user-generated snapshots may also be generated by the user. The user has to manually generate the data transfer path because the data protection module and the source client device are provided by different vendors, which resulted in the asset source being unidentifiable (automatically) by the data protection module and/or the source client device migration agent.

In Step 428, a PLC service is configured for the user-generated snapshots from Step 424. In one or more embodiments, the PLC service for the user-generated snapshots may again be configured manually by the user.

In Step 430, the user-generated snapshots are obtained (e.g., by the data protection module) using the user-generated data transfer path from Step 426.

In one or more embodiments of the invention, the data protection module may store the user-generated snapshots in the storage using the auto slicing method or the auto scale method.

In Step 432, an index is generated for each file in the user-generated snapshots by, for example, the data protection module.

In Step 434, the user data that is backed up to the target client device is specified as a current asset source by, for example, the user.

In Step 436, the user data of the current asset source is analyzed by, for example, the data protection module to generate a PLC service for the user data.

In Step 438, a PLC service is configured for the user data of the current asset source by, for example, the user.

In Step 440, a determination is executed to determine whether the backup of the user data to the target client device is completed. In one or more embodiments, the determination may be performed by the target client device migration agent using the backup monitoring service provided by the source client device migration agent. For example, by using the backup monitoring service, the target client device migration agent may compare the original user data in the original asset source of the source client device with the backed up user data in the current asset source of the target client device. The target client device migration agent may then determine whether that backup is successfully completed if the backed up user data matches the original user data.

In Step 442, the original user data in the original asset source of the source client device is deleted by, for example, the source client device migration agent.

In Step 444, the snapshots of the original asset source of the source client device may also be deleted with the original user data.

In one or more embodiments of the invention, the method may end following Step 444.

Turning now to FIG. 5, FIG. 5 shows a diagram of a computing device in accordance with one or more embodiments of the invention.

In one or more embodiments of the invention, the computing device (500) may include one or more computer processors (502), non-persistent storage (504) (e.g., volatile memory, such as RAM, cache memory), persistent storage (506) (e.g., a hard disk, an optical drive such as a compact disk (CD) drive or digital versatile disk (DVD) drive, a flash memory, etc.), a communication interface (512) (e.g., Bluetooth interface, infrared interface, network interface, optical interface, etc.), an input device(s) (510), an output device(s) (508), and numerous other elements (not shown) and functionalities. Each of these components is described below.

In one or more embodiments, the computer processor(s) (502) may be an integrated circuit for processing instructions. For example, the computer processor(s) may be one or more cores or micro-cores of a processor. The computing device (500) may also include one or more input devices (510), such as a touchscreen, keyboard, mouse, microphone, touchpad, electronic pen, or any other type of input device. Further, the communication interface (512) may include an integrated circuit for connecting the computing device (500) to a network (not shown) (e.g., a local area network (LAN), a wide area network (WAN), such as the Internet, mobile network, or any other type of network) and/or to another device, such as another computing device.

In one or more embodiments, the computing device (500) may include one or more output devices (508), such as a screen (e.g., a liquid crystal display (LCD), plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (502), non-persistent storage (504), and persistent storage (506). Many different types of computing devices exist, and the aforementioned input and output device(s) may take other forms.

The problems discussed throughout this application should be understood as being examples of problems solved by embodiments described herein, and the various embodiments should not be limited to solving the same/similar problems. The disclosed embodiments are broadly applicable to address a range of problems beyond those discussed herein.

While embodiments discussed herein have been described with respect to a limited number of embodiments, those skilled in the art, having the benefit of this Detailed Description, will appreciate that other embodiments can be devised which do not depart from the scope of embodiments as disclosed herein. Accordingly, the scope of embodiments described herein should be limited only by the attached claims.

What is claimed is:

1. A method for managing data backup, the method comprising:
    making a determination that an asset source is a first type of asset source, wherein a source client device comprises the asset source;
    generating, based on the determination, a data transfer path for a plurality of snapshots associated with the asset source between the source client device and a data protection system;
    initiating a backup for user data associated with the asset source to a target client device;
    obtaining the plurality of snapshots associated with the asset source to the data protection system using the data transfer path, wherein the user data associated with the asset source is backed up in the target client device while at least a portion of the plurality of snapshots is obtained by the data protection system; and
    deleting the plurality of snapshots associated with the asset source from the source client device, upon receipt of confirmation that the plurality of snapshots is successfully stored in the data protection system.

2. The method of claim 1, further comprising:
    making a second determination that the backup for the user data associated with the asset source is completed; and
    deleting, based on the second determination and after receiving the confirmation, the user data associated with the asset source from the source client device.

3. The method of claim 2, wherein the user data associated with the asset source is deleted based on a user data retention service level agreement.

4. The method of claim 1, wherein the plurality of snapshots associated with the asset source is deleted based on a snapshot retention service level agreement.

5. The method of claim 1, wherein the plurality of snapshots is stored using an auto scale method or an auto slicing method.

6. The method of claim 1, further comprising:
making a second determination that a second asset source is a second type of asset source, wherein a second source client device comprises the second asset source;
receiving, based on the second determination, a user-generated data transfer path for a second plurality of snapshots associated with the second asset source between the second source client device and the data protection system;
initiating a backup for second user data associated with the second asset source to the target client device;
obtaining the second plurality of snapshots associated with the second asset source to the data protection system using the user-generated data transfer path, wherein the second user data associated with second asset source is backed up in the target client device while at least a portion of the second plurality of snapshots is obtained by the data protection system; and
deleting the second plurality of snapshots associated with the second asset source from the second source client device, upon receipt of a second confirmation that the second plurality of snapshots is successfully stored in the data protection system.

7. The method of claim 6, further comprising:
making a third determination that the backup for the second user data associated with the second asset source is completed; and
deleting, based on the third determination and after receiving the second confirmation, the second user data associated with the second asset source from the second source client device.

8. A non-transitory computer readable medium comprising computer readable program code, which when executed by a computer processor enables the computer processor to perform a method for managing data backup, the method comprising:
making a determination that an asset source is a first type of asset source, wherein a source client device comprises the asset source;
generating, based on the determination, a data transfer path for a plurality of snapshots associated with the asset source between the source client device and a data protection system;
initiating a backup for user data associated with the asset source to a target client device;
obtaining the plurality of snapshots associated with the asset source to the data protection system using the data transfer path, wherein the user data associated with the asset source is backed up in the target client device while at least a portion of the plurality of snapshots is obtained by the data protection system; and
deleting the plurality of snapshots associated with the asset source from the source client device, upon receipt of confirmation that the plurality of snapshots is successfully stored in the data protection system.

9. The non-transitory computer readable medium of claim 8, further comprising:
making a second determination that the backup for the user data associated with the asset source is completed; and
deleting, based on the second determination and after receiving the confirmation, the user data associated with the asset source from the source client device.

10. The non-transitory computer readable medium of claim 9, wherein the user data associated with the asset source is deleted based on a user data retention service level agreement.

11. The non-transitory computer readable medium of claim 8, wherein the plurality of snapshots associated with the asset source is deleted based on a snapshot retention service level agreement.

12. The non-transitory computer readable medium of claim 8, wherein the plurality of snapshots is stored using an auto scale method or an auto slicing method.

13. The non-transitory computer readable medium of claim 8, further comprising:
making a second determination that a second asset source is a second type of asset source, wherein a second source client device comprises the second asset source;
receiving, based on the second determination, a user-generated data transfer path for a second plurality of snapshots associated with the second asset source between the second source client device and the data protection system;
initiating a backup for second user data associated with the second asset source to the target client device;
obtaining the second plurality of snapshots associated with the second asset source to the data protection system using the user-generated data transfer path, wherein the second user data associated with the second asset source is backed up in the target client device while at least a portion of the second plurality of snapshots is obtained by the data protection system; and
deleting the second plurality of snapshots associated with the second asset source from the second source client device, upon receipt of a second confirmation that the second plurality of snapshots is successfully stored in the data protection system.

14. The non-transitory computer readable medium of claim 13, further comprising:
making a third determination that the backup for the second user data associated with the second asset source is completed; and
deleting, based on the third determination and after receiving the second confirmation, the second user data associated with the second asset source from the second source client device.

15. A system for managing data backup, the system comprising:
a processor comprising circuitry;
memory comprising instructions, which when executed perform a method, the method comprising:
making a determination that an asset source is a first type of asset source, wherein a source client device comprises the asset source;
generating, based on the determination, a data transfer path for a plurality of snapshots associated with the asset source between the source client device and a data protection system;
initiating a backup for user data associated with the asset source to a target client device;
obtaining the plurality of snapshots associated with the asset source to the data protection system using the data transfer path, wherein the user data associated with the asset source is backed up in the target client device while at least a portion of the plurality of snapshots is obtained by the data protection system; and deleting the plurality of snapshots associated with the asset source from the source client device, upon receipt of confirmation that the plurality of snapshots is successfully stored in the data protection system.

16. The system of claim 15, further comprising:
making a second determination that the backup for the user data associated with the asset source is completed; and
deleting, based on the second determination and after receiving the confirmation, the user data associated with the asset source from the source client device.

17. The system of claim 16, wherein the user data associated with the asset source is deleted based on a user data retention service level agreement.

18. The system of claim 15, wherein the plurality of snapshots associated with the asset source is deleted based on a snapshot retention service level agreement.

19. The system of claim 15, wherein the plurality of snapshots is stored using an auto scale method or an auto slicing method.

20. The system of claim 15, further comprising:
making a second determination that a second asset source is a second type of asset source, wherein a second source client device comprises the second asset source;

receiving, based on the second determination, a user-generated data transfer path for a second plurality of snapshots associated with the second asset source between the second source client device and the data protection system;

initiating a backup for second user data associated with the second asset source to the target client device;

obtaining the second plurality of snapshots associated with the second asset source to the data protection system using the user-generated data transfer path, wherein the second user data associated with second asset source is backed up in the target client device while at least a portion of the second plurality of snapshots is obtained by the data protection system; and deleting the second plurality of snapshots associated with the second asset source from the second source client device, upon receipt of a second confirmation that the second plurality of snapshots is successfully stored in the data protection system.

* * * * *